W. Baker,
Hydraulic Engine.
N°. 1,614.    Patented May 19, 1840.
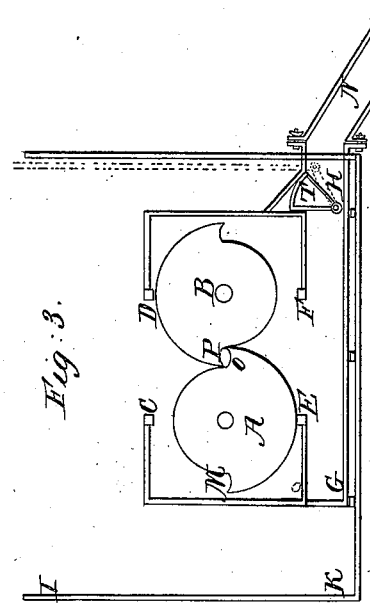
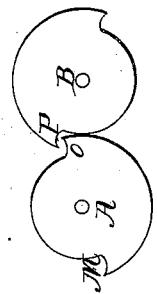
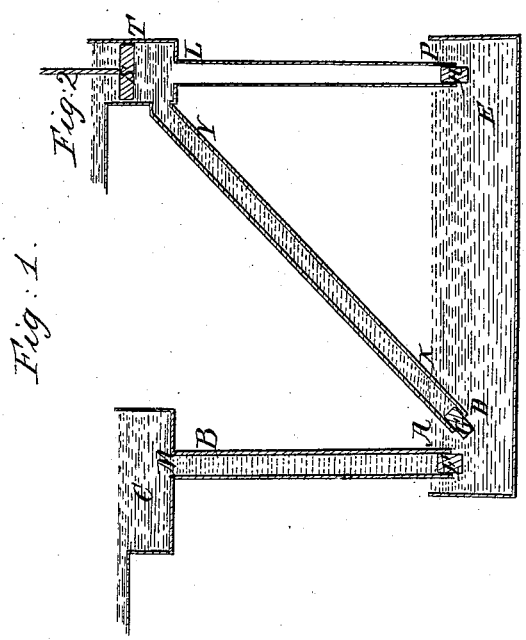
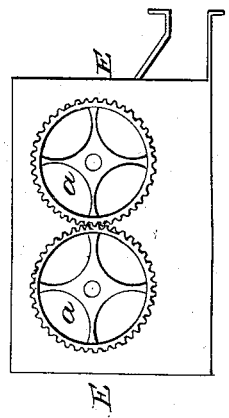

UNITED STATES PATENT OFFICE.

WM. BAKER, OF UTICA, NEW YORK.

MODE OF APPLYING WATER TO PROPEL MACHINERY.

Specification of Letters Patent No. 1,614, dated May 19, 1840.

*To all whom it may concern:*

Be it known that I, WILLIAM BAKER, of the city of Utica, in the State of New York, have discovered a new and useful mode of applying the power of falling water to the propelling of mills and other machinery, that I have invented a new and useful engine or machine to obtain the power of falling water, by which the said newly-discovered mode may be usefully applied; and I do hereby declare that the following is a full and exact description.

The well known pneumatic truth, that the pressure of the atmosphere on all surfaces is equal to 33 feet perpendicular pressure of water, or 15 pounds to every square inch, is a principal foundation of my invention, as it is by the agency of this pressure of atmosphere that the power of descending water is made available without requiring a perpendicular fall thereof; a descent over an inclined plane, and even over irregularities of surface being equally effectual, provided the same depression is finally obtained.

I will first explain the principle of obtaining an efficient power through the joint agency of the pressure of the atmosphere and of descending water, and I will then proceed to show how that principle is made practicable by my invention.

Let A, B, Figure 1, be a vertical tube, through which the water flows from the flume C into the pool D E below. While the water is thus passing let the stopper F be inserted in the lower end of the tube. It is now evident that this stopper must sustain the pressure of the entire weight of the column of water resting upon it, and extending to the surface of the water in the flume C. Let the stopper F now be removed from the lower end of the tube and placed in its upper end at M. This being done the water in the tube will remain stationary, unless the length of the conductor from the lower end of the stopper at M to the surface of the water at P is more than 33 feet, being sustained there by the weight of atmosphere pressing on the surface of the water around the lower end of the tube, and the stopper will be pressed inward by a weight equal to that which pressed it outward when in the lower end of the tube. If the tube is more than 33 feet in length between the points just mentioned the water will decline in it, leaving a perfect vacuum at the upper end of the tube, the water still standing at an elevation of 33 feet above its surface in the pool below. Applying these principles to Fig. 2 let P L be a similar tube communicating in like manner between the cylinder T and the pool D E. The whole being filled with water, let the stopper H be removed, and it is evident that the weight before resting on the stopper H would now be transferred to the piston S, and that this would be immediately depressed, with a velocity corresponding to the escape of the water below, unless withheld by a power equal to the weight of a column of water of a height of the surface of the water in the cylinder above that in the pool below, and of a capacity equal to that of the piston itself. The same results are produced through the oblique tube X Y by the removal of the stopper G, notwithstanding its greater length and inclination, the total depression from the upper to the lower end of both tubes being the same. And it is obviously immaterial how gentle, or how abrupt the declivity may be over which this tube is made to pass, or whether on a uniform or irregular surface, extending for a longer or shorter distance, provided the same depression is finally obtained for the discharge, and provided the capacity of the tube is sufficient in all cases to discharge the same quantity of water. And it is also obvious that the same amount of pressure upon the piston S is obtained by the descent of the water through the inclined tube X Y as would be occasioned by the direct pressure of a body of water resting upon it, of a height equal to the descent through the inclined tube below. So that no greater head or perpendicular descent of water is required than is sufficient to cover the piston and exclude the air. These explanations are intended to exemplify the principle of the new mode discovered by me of applying the power of falling water; and to show the practicability of rendering efficient the whole power of falling water by using it in conjunction with the pressure of the atmosphere.

I will now for the purpose of enabling others skilled in the art, to make and use my invention, proceed to describe the engine which I have invented, by which this power is made to operate effectively, by a simple, convenient and economical process, and by which a rotary motion is originally produced, applicable to the propulsion of any machinery whatever. The main or working part of this engine consists of two irregular cylinders, the ends of which are seen in the annexed cut Fig. 3 at A and B. They are alike in all respects and maintain the shape seen in the figure from end to end, being of a compound diameter or half of one size, and half of another, and when in motion they maintain a uniform relative position, the lesser side of the one being always opposite, or in contact with the larger side of the other. Each cylinder has a shaft passing through its center, and projecting at each end sufficient to form bearings, nicely turned off and fitted to journal boxes placed in the sides of the box E E Fig. 4 which incloses the cylinders. These cylinders may be formed by placing firmly upon the shaft the material to be used and first turning off a perfect cylinder of the size of the smaller diameter. Then adding the material designed for the outer, or larger diameter, turn off its surface to the required size. The difference between the two diameters projecting equally on opposite sides of the cylinder first formed, form the buckets of the respective wheels, or cylinders, to which the propelling power is applied. The position of these cylinders is such that their buckets in making their revolutions, lock by each other as they meet at the point of conjunction; and for this purpose the outer, or larger half of each, falls a little short of a semicircle, and each bucket is curved inward to prevent its interference with the outer point of the opposite bucket in passing, forming a crescent on one side of the smaller or first mentioned cylinder.

The cylinders are kept in their proper relative position by two cogged wheels of similar circumference, as seen at *a a* Fig. 4, one of them attached to the shaft of each cylinder, on the outside of the box or incasement as seen in Fig. 4 which represents an exterior view of the engine, or one side of the box, and the connecting wheels which are left off in Fig. 3. The top and bottom of this box are so constructed as to present the guards C D E F, Fig. 3, leaving just space enough between those above, and below each cylinder to permit its largest diameter to pass in making a revolution. This box is extended at the bottom and the additional unbroken bottom G H Fig. 3 is added, forming a trunk to receive the water after it has passed the engine, and to transmit it to the conductor N.

The whole engine when completed, is placed in a flume, or reservoir I K H L Fig. 3 into which the water flows, completely covering it. The conductor N is attached for the purpose of receiving the water that has acted upon and passed the engine and conducting it down the declivity, or descent which may be obtained below, either oblique or perpendicular and discharging it at the foot of the fall to be used. It is made tight by being buried underground or otherwise, and discharges under water, excluding the air from the lower orifice. The gate T being raised, the air in the conductor is forced out at its lower end by the descent of the water, or it rises through the water and issues at its surface in the flume, and its place is supplied by the water which completely fills the conductor. If by reason of heavy machinery attached to the engine, the head of water above is not sufficient to turn it so as to permit the conductor to be filled through the engine, in that case a gate is used on the side of the conductor, within the flume, which being raised admits the water from the flume into the conductor independent of the engine. The conductor N being filled, and the gate T raised, the water receding by its own gravity through the conductor will be followed by that pressing on the upper surfaces of the cylinders, if it is not obstructed in its passage. But as the guards D and E bear the passages around the cylinders, and as the conjunction of their surfaces prevents all passage between them, no supply can be given the conductor from above, unless the bucket M yields to the pressure upon it, and moving onward, brings the smaller diameter of its cylinder opposite the guard E, thus opening a passage for the water following it. This it will do under a weight of pressure equal to a column of water of a width and breadth corresponding to the dimensions of the bucket, and of a height equal to the elevation of the surface of the water in the flume above that into which the conductor discharges below. A portion of this pressure corresponding to that part of the fall below the engine, being from the weight of atmosphere pressing on the surface of the water in the flume, and made effective by the gravity of the water in the conductor, repelling a correspondent amount of atmospheric pressure at its lower orifice; and thus tending to the creation of a vacuum in the upper part of the conductor, and in the space under the two cylinders.

That the amount of pressure here mentioned will be exerted upon the bucket M to propel it forward undiminished by any counterpressure, is obvious from an inspection of the figure. Each of the cylinders in the position they there occupy, independent of the bucket M presents to the pressure from above, a surface communicating the pressure it receives directly upon its axis. The cylinder B a quadrant of its largest circle from D to P; and the cylinder A the entire surface of its smaller semicircle from P to M as well as a quadrant of its larger semicircle from M to the guard E. Each without the bucket M sustaining a pressure equal on either side of its axis, would be held *in equilibrio*, and capable of being moved as easily one way as the other, so that a preponderance of power equal to the entire weight resting on the bucket M is permitted to act directly to propel the engine. The cylinder A being moved by the pressure on the bucket M, the other cylinder is also moved in a corresponding degree by means of their connection through the wheels on the outside of the box as seen in Fig. 4, and they are instantly placed in the position as seen in Fig. 5, when the bucket O being uncovered by the bucket P receives a pressure equal to that on the bucket M, bringing the cylinder A into a state of equilibrium. At the same instant the bucket P receives a pressure equal to that upon either of the buckets on the cylinder A, while the opposite bucket on the cylinder B is not pressed upon at all. Consequently the cylinder B is forced around till it occupies a position corresponding to that of cylinder A as seen in Fig. 3. The bucket P occupying on the outside of its cylinder the same relative position of the bucket M in the figure, and receiving the same pressure, yields to it, and continues its revolution. Thus a continuous motion is given to the two cylinders, each obtaining the advantage of a preponderating lever for half its revolution, equal in length to the width of its bucket, a counterpressure on its opposite bucket being prevented by the guard interposed by the larger diameter of the other cylinder. And as the semidiameter of one cylinder, measured through its largest, added to the semidiameter of the other measured through its smallest diameter, just equal the distance between the centers of the axes of the two cylinders, and as these are always in conjunction between the two, no passage for the water is ever permitted there, hence it is driven alternately to pass on the outside of each cylinder, and under the guard C or D as the respective smaller semicircles of the cylinders are presented, and in each case carrying with it the bucket of the cylinder which occupies the passage before it.

The gate T is used to close the conductor, and stop the engine. It consists of a section of a hollow cylinder, bolted to the ends of iron arms, or radii as seen in the figure. It lies horizontally the whole length of the passage, and a journal projects at each end from the diverging point of these arms, fitted to boxes placed in the sides of the conductor, one of which passes through and receives a crank on the outside by which the gate is opened and closed. This crank and the rod by which it is worked are indicated by the dotted lines at H and L. The gate is raised by a lever, screw or any other means applied to the upper end of the rod L. It is represented in the figure as being raised, permitting a free passage of the water from the engine to the conductor. By depressing the rod L the gate is thrown down when it completely closes the passage, and the engine stops. This being done the water stands in the conductor, being sustained there by the passage of the atmosphere on the surface of the water below, into which the conductor is discharged, and the entire weight which had before propelled the engine is now sustained by the gate. The instant that is again raised, this weight is transferred to the bucket which happens to be in the proper position to receive it, and the engine is again put in motion.

The gate may be placed in any convenient position, either below the engine to bar the escape of the water from it, or above to prevent its admission to it. In either case its effect in governing the motion of the engine will be the same. Any other form of gate may be used, as the common lattice gate, or any other form that may be convenient. But as the gate when closed sustains a heavy pressure, unnecessary friction should be avoided.

The fall in the stream which may be at command, or which it may be desirable to use, may be divided, and such part used above and such part below the engine as may be convenient, the power exerted on the engine being the same; and it being only necessary that sufficient depth of water be used above to keep the engine covered so as completely to exclude the air.

The cylinders may be made of wood or iron, and in either case should be turned off or otherwise made true on their shafts, and so placed in the frame or box surrounding them that they will move as close to each other, and to each of the guards as may be without rubbing. If great exactness or economy in the expenditure of water is required, the smaller circle of each cylinder may be made an entire independent cylinder, and made to turn on the shaft within the concave of the larger, and thus being movable the two cylinders may run in contact. Packing may in that case be used within the concave of the larger cylinder, thus totally excluding the passage of any water.

The comparative sizes of the larger and smaller cylinders are confined to no exact proportion. Such a proportion as will make the projection for each bucket equal to one-sixth of the larger diameter of the cylinder will be found to work well.

The conductor may be made of wood, or iron, or of any other material of which a tight conductor may be formed, and for certainty and ease in excluding the air and to be free from frost and other casualties, should be covered with earth.

The machinery to be propelled is attached to the end of one or both of the shafts of the two cylinders, which for that purpose are of sufficient length to pass through the sides of the flume so as to receive a wheel, strap or other gearing free from the water of the flume.

Should it be desirable to use two or more engines near or adjacent to each other, both or as many as may be desired may be operated by one conductor. This is done by constructing within and upon the bottom of the flume a tight horizontal trunk of sufficient length and capacity to accommodate as many engines as are to be used. The engines are placed on the bottom of the flume in such a manner that this trunk occupies the space between them and the side of the flume, and an aperture as at E F Fig. 3 is made to communicate with the interior of this trunk by a corresponding aperture therein. The conductor through which the water is to be discharged communicates also with this horizontal trunk from without through the side of the flume. The aperture through which each engine communicates with this horizontal trunk is contracted to such dimensions as are sufficient only to permit water enough to pass to carry the engine, and a gate is placed at each of these passages. Either of the gates being raised, the discharge of water from the engine is into this common trunk and thence through the only escape from it into the conductor. The vacuum which is formed by the receding of the water through the conductor constantly pervading every part of the horizontal trunk is communicated to the interior of each engine whenever its gate is raised, thus affording to each engine the benefit of the entire fall through the conductor, which in such case is of sufficient capacity to allow free passage to a volume of water equal to the discharge from the gates of all the engines. The conductor being constantly full the current or velocity of the water in its passage through it will be proportionate to the quantity admitted from above, or the number of gates raised, as no greater quantity can be discharged at its lower orifice than is permitted to enter above.

What I claim as my invention and desire to secure by Letters Patent is,

1. The method herein described of applying the atmospheric pressure to propel a revolving engine or machine by placing a conductor for the passage of the water below such engine or machine, by the descent of the water in which conductor a pressure of atmosphere is brought to bear on the engine or machine corresponding to the height of the column of water below it.

2. I also claim the combination of the revolving cylinders and the inclosure in which they are placed, with the conductor below such engine, the whole being constructed, arranged and operating substantially in the manner herein set forth.

WILLIAM BAKER.

Witnesses:
HENRY STONE,
ARTHUR L. McINTIRE.